No. 644,531. Patented Feb. 27, 1900.
H. MORTON, Dec'd.
FIDELITY TITLE AND TRUST COMPANY, Administrator.
OPEN GRAVITY FILTER.
(Application filed Apr. 30, 1898.)
(No Model.)
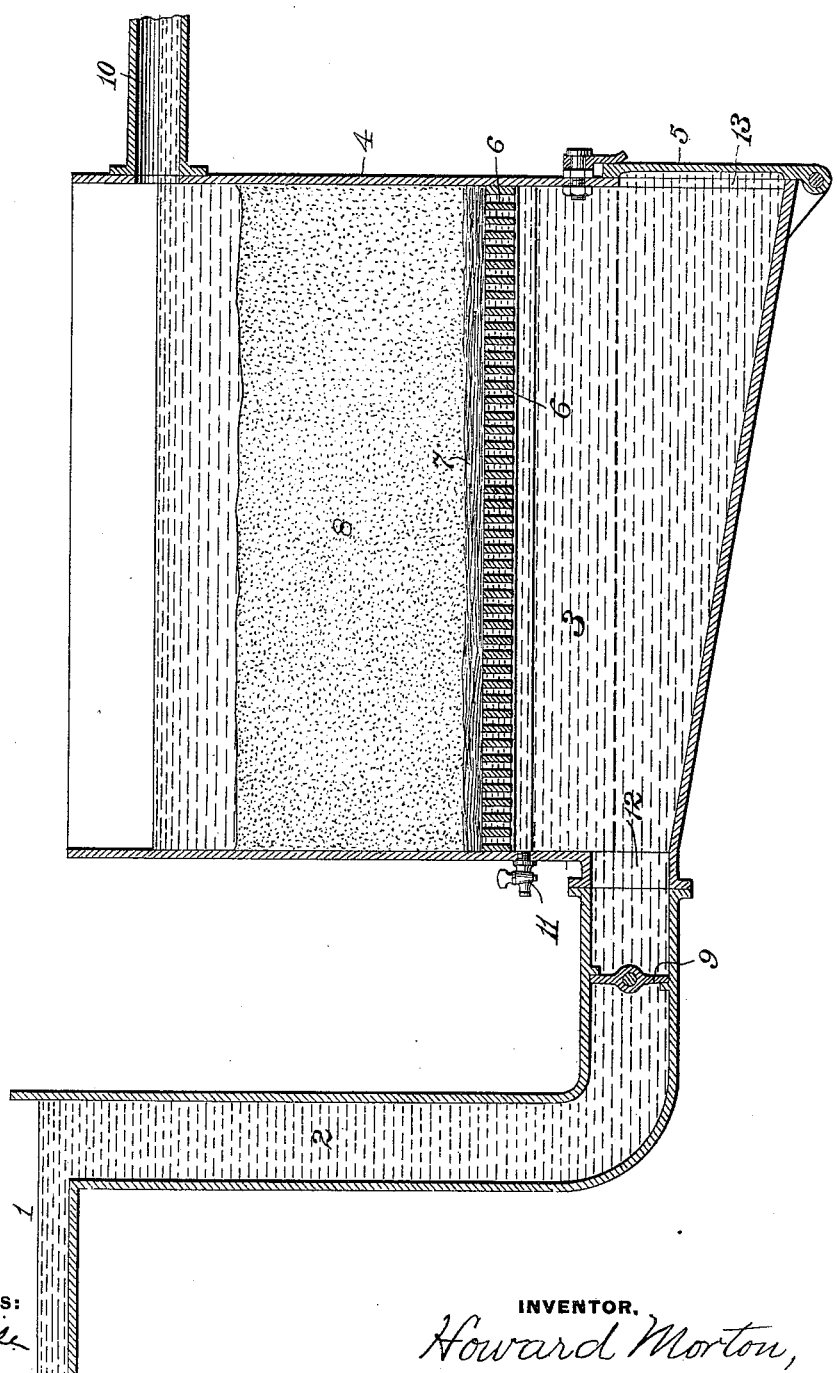
WITNESSES:
W. G. Doolittle
E. Gallagher
INVENTOR.
Howard Morton,
by T. J. Hogan,
Att'y.

UNITED STATES PATENT OFFICE.

HOWARD MORTON, OF PITTSBURG, PENNSYLVANIA; FIDELITY TITLE AND TRUST COMPANY, OF SAME PLACE, ADMINISTRATOR OF SAID MORTON, DECEASED.

OPEN GRAVITY-FILTER.

SPECIFICATION forming part of Letters Patent No. 644,531, dated February 27, 1900.

Application filed April 30, 1898. Serial No. 679,345. (No model.)

*To all whom it may concern:*

Be it known that I, HOWARD MORTON, a citizen of the United States, residing at Pittsburg, in the county of Allegheny and State of Pennsylvania, have invented or discovered a certain new and useful Improvement in Open Gravity-Filters, of which improvement the following is a specification.

The object of my invention is to provide new and improved means for filtering water, preferably applicable on a large scale and to such purposes as the purification of the water-supply of cities; and to this end my invention consists in a new and improved construction of an open gravity-filter bed, by means of which the purification of the water and the cleansing of the filter and filtering material is effected by a simple, inexpensive, and efficient method.

In the practice of my invention I provide means whereby the water to be purified is supplied by gravity to the filter under a comparatively-small head, due to a difference in level between the sources of supply and the surface of the filtered water above the filter-bed, and the purification of the water is effected in the course of its gradual upward passage through the filter-bed. The dimensions of the filter-bed are not limited to any particular size, as might be the case in filtering devices which operate under pressure, but may be, if necessary, several acres in extent, according to the quantity of filtered water to be supplied, and, if desired, the filter-bed may be subdivided or duplicated or multiplied to any extent to supply the demand for water or to lessen the head, and consequently the velocity of flow through the filtering material needed to insure a sufficient supply of pure water. The surface of the filtered water above the filtering material and the surface of the water in the source of supply are both open to the atmosphere and receive the benefit of contact with the air; but they may, if preferred, be covered over or roofed in to prevent the settling of impurities thereon.

In most filtering devices the closed discharge-chamber or chamber in which the filtered water is held before being discharged is in such a condition that the water in its passage through the chamber after being filtered may be polluted and rendered less pure than before it was filtered. By means of my improvement the silt or residuum in the filtering material may be washed out by filtered water, and the sediment in the bottom of the filter may be washed out by direct action of the unfiltered water or by filtered water, or both, the flow of both the filtered and unfiltered water for this purpose being effected by the force of gravity.

The accompanying drawing, which illustrates an application of my invention, is a vertical section through an open gravity-filter bed constructed in accordance with my invention.

As shown in the drawing, the reservoir or main source of water-supply 1 communicates through a passage 2 with a chamber 3, located in the bottom of a vessel, tank, or well 4, which contains the filtering material or filter-bed. The bottom of the chamber 3 slopes downwardly from the opening of the passage 2 to a door or valve 5, which is hinged at the bottom and adapted to be suddenly opened to its full extent. The opening controlled by this valve or door is of much greater capacity than that of the opening 12 by which the passage 2 communicates with the chamber 3, and when the valve 5 is opened it moves outward and downward from the chamber 3 and hangs in a vertical position out of the way of and without offering any obstruction to the flow of water from the chamber. The object of this construction is to provide means for suddenly discharging the water from the chamber 3, and my invention is not limited to this particular construction shown.

Above the chamber 3 is located a perforated or reticular support or grating 6, preferably formed of wooden slats, upon which is placed a layer of hay or straw 7, and above and resting on the hay or straw is a bed of filtering material 8, preferably of clean sharp sand, at the bottom of which, if preferred, a layer of gravel may be placed.

In first charging the filter the valve 5 is closed, and the air-valve 11 in the upper part of the chamber 3 and the valve 9 in the passage 2 are opened. The water from the reservoir 1 passes through the passage 2 into the chamber 3, and, driving out the air therein through the valve 11, passes gradually upward through the grating 6 and through the hay and sand or other filtering material with just sufficient force to overcome the resistance due to the friction of the water on the filtering material. The upward movement of the water being by a kind of natural seepage or flow through the pores of the filtering material no disturbance or agitation of the sand occurs, there is practically no waste of the filtering material, and no need for frequent renewal. The water rises but a few inches above the filtering material and flows off through the outlet 10. As soon as the air has been displaced from the chamber 3 and water begins to flow through the air-valve 11 that valve may be closed.

As the water from the reservoir passes slowly upward through the grating 6 and through the filter-bed, the passage of any solid matter, mud, slime, sand, or dirt in the water is obstructed or altogether prevented not only by the filtering material, but by the action of gravity, and the sediment, silt, or residuum is deposited on the bottom of the chamber 3, on the grating 6, and on the filtering material in the lower portion of the filter-bed, and the pure clear water wells up through the sand as in a natural spring without any disturbance or displacement of the filtering material by which the filtering material might be carried off with the filtered water, as occurs in pressure-filters, and without any packing of the sand or other filtering material, such as occurs when the filtering is effected by a downward passage of the water.

The inlet-opening 12 and the outlet-opening controlled by the valve 5 are so located that their upper edges are some distance below the bottom of the grating 6, so that a space or vacuum-chamber is formed above them, and when the filter is in operation there is a considerable body of water above these openings and between them and the bottom of the filter-bed.

When it is desired to clean the filter, the valve 5 is suddenly and fully opened, so as to cause a sudden discharge of water from the chamber 3 through the passage 13, controlled by the valve 5, and most of the sediment, silt, or residuum in the chamber 3 will be washed out immediately.

The capacity of the opening 13 as compared with that of the opening 12 and passage 2 is such that the admission of water through the opening 12 is much too small to keep the chamber 3 charged while the valve 5 is opened, and when the valve 5 is opened the body of water in the chamber 3 below the filter-bed and above the openings 12 and 13 is entirely withdrawn from contact with the lower portion of the filter-bed and in its downward movement acts as a liquid piston, tending to create a vacuum between its upper surface and the bottom of the filter-bed. This action is due to the fact that the water in and above the filter-bed cannot pass down through the bed as rapidly as the water below the bed is discharged through the opening 13. When a partial vacuum is formed by the movement of the filtered water below the bed, the filtered water above the bed passes down through the filtering material under the action of gravity and the suction caused by the sudden discharge of water from the chamber 3.

Any adhesive matter, silt, or residuum in or adhering to the filtering material or grating is then washed out by the downward flow of the filtered water through the filter-bed and a thorough cleansing of the filtering material is effected. The continued flow of water through the inlet-passage 2 may be employed to wash out any material remaining in the chamber 3 after the first discharge of water therefrom and after the cessation of the downward flow of filtered water through the bed.

If preferred, the valve 9 in the passage 2 may be closed before opening the valve 5, and the cleansing may be effected by the sudden discharge of water from the chamber 3 and by the downward flow of filtered water through the bed; but the cleansing of the chamber 3 will not be so thorough as when the chamber is washed out by the flow from the passage 2.

With my improvement both the main bodies of unfiltered and filtered water are exposed to the purifying action of the atmosphere, and they may be connected by a comparatively-short closed passage. The movement of the water to the filter and through its lower chamber is so gradual as to permit the deposition of a considerable portion of foreign matter before coming in contact with the filtering material, and the direction of the flow through the filtering material being vertical the cleansing of the water is effected not merely by the contact of the impurities with the filtering material or by their adhesion thereto, but also by the resistance to upward movement of the impurities due to the action of gravity. This action, which is a decided advantage in my improvement, is very objectionable in filtering devices, in which the flow through the filtering material is downward instead of upward, for the reason that in such devices the action of the moving water and the action of gravity both tend to carry the impurities down and through the filtering material instead of separating them from the water.

In my improvement the slats, gravel, and other supporting material are immersed in water, and should any mud, slime, or other organic matter become attached thereto there will be nothing to retain it in place or to permit its accumulation in any considerable quantity, and it will be precipitated by the action of gravity and the dissolving action of the water to the bottom of the chamber 3, where it will tend to collect near the door or valve 5 out of the way of the slowly-moving water from the passage 2. The mud and slime thus deposited in the bottom of the chamber 3 will carry with it most of the bacteria contained in the water and prevent the collection of these germs in the filter-bed, whereas in other constructions, in which the movement of the water is downward when filtering these germs are collected on the top of the bed of sand or other material and are gradually forced into it until the filter-bed becomes a means of increasing instead of diminishing the quantity of bacteria in the water.

My improvement is of special advantage in filtering such muddy waters as are found in the Ohio, Mississippi, and Missouri rivers, and operates to separate the mud and dirt from the water in great quantities before the mud and dirt can pass into the filter-bed.

Another objectionable feature of filter-beds in which the flow through the filtering material is downward and which is obviated in my improvement is the packing of the filtering material under the action of gravity and of the downward current of water, both tending to press or pack the filtering material against its supporting frame, plate, or grating. This action is particularly noticeable in filters operating under pressure when the direction of flow is downward or when the current of water tends to carry the filtering material against its support or casing, and in such pressure-filters, when the current is upward or tends to carry the filtering material away from its support, the particles of filtering material are so disturbed and separated by the action of the water that the efficiency of the device is very much diminished.

In my improvement the cleansing of the filtering material is effected by the action of filtered water instead of by unfiltered water, which is itself filled with impurities, and the operation is effected automatically and without the employment of artificial pressure by merely opening the outlet-valve from the chamber below the filter-bed. The clean filtered water is then forced downward through the filtering material under the action of gravity and the unbalanced atmospheric pressure and washes out the silt or residuum which may have collected there, leaving no deposit of impure or foreign matter on or near the upper surface of the bed, as would be the case if unfiltered water were employed for this purpose.

The form and dimensions of the chamber below the filter and of the opening controlled by the valve 5 are such that the chamber 3 and its bottom or floor and the grating above it may be readily cleaned by mechanical or other means whenever it becomes necessary.

I claim as my invention and desire to secure by Letters Patent—

1. In a filter, open at the top and having the surface of the water therein exposed to the atmosphere, a bed of filtering material, a chamber below the filtering material, an inlet-passage opening into the chamber, and an outlet-passage of greater capacity than the inlet-passage for suddenly releasing the water from the chamber, and a space or chamber above the inlet-passage in which a vacuum or a partial vacuum may be created, substantially as set forth.

2. The combination, in a filtering device, of a bed of filtering material, a chamber below the filtering material having an inlet and an outlet passage, the outlet-passage being of greater capacity than the inlet-passage, means for closing the inlet-passage and means for suddenly releasing the water from the chamber whereby the filtering material may be cleaned by the downward flow of filtered water under the action of gravity and unbalanced atmospheric pressure, substantially as set forth.

3. In an open-top filter, the combination, of a bed of filtering material, a chamber below the filtering material having an inlet and an outlet passage, the outlet-passage being of greater capacity than the inlet-passage, a space or chamber above the inlet and outlet passages and below the filtering-bed, means for suddenly releasing the water from the chamber through the outlet-passage to create a vacuum or a partial vacuum between the surface of the water in the chamber and the bottom of the filter-bed whereby a rapid downward flow of filtered water through the filtering material is effected, substantially as set forth.

In testimony whereof I have hereunto set my hand.

HOWARD MORTON.

Witnesses:
EDWARD B. VAILL,
W. G. DOOLITTLE.